United States Patent
Wason

(10) Patent No.: US 6,857,103 B1
(45) Date of Patent: Feb. 15, 2005

(54) FLEXIBLE HELP SUPPORT IN AN OBJECT ORIENTED APPLICATION

(75) Inventor: James Richard Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 09/616,808

(22) Filed: Jul. 14, 2000

(51) Int. Cl.[7] .............................................. G09G 5/00
(52) U.S. Cl. ...................................... 715/709; 715/714
(58) Field of Search ................................ 715/705–713, 715/714, 747, 762

(56) References Cited

U.S. PATENT DOCUMENTS

| | | | |
|---|---|---|---|
| 5,832,268 A | | 11/1998 | Anderson et al. |
| 6,133,917 A | * | 10/2000 | Feigner et al. ............... 345/708 |
| 6,246,404 B1 | * | 6/2001 | Feigner et al. ............... 345/708 |
| 6,259,445 B1 | * | 7/2001 | Hennum et al. ............. 345/709 |
| 6,342,907 B1 | * | 1/2002 | Petty et al. ................. 345/762 |

OTHER PUBLICATIONS

Screen Dumps of Microsoft Windows NT (pp. 1–3, 1998).*

* cited by examiner

*Primary Examiner*—Kristine Kincaid
*Assistant Examiner*—Le Nguyen
(74) *Attorney, Agent, or Firm*—Scully, Scott, Murphy & Presser; William E. Schiesser

(57) ABSTRACT

A "helpHelper" bean is attached (using the VisualAge visual editor) to a panel for which help is to be provided. The custom editor for the helpHelper bean brings up the target panel, along with a help editor panel that shows which component of the target panel is selected, allowing help for that part to be assigned. At run time, the helpHelper bean listens to which part of the panel is selected, and brings up the help for that part when it is requested (if F9 is hit). The runtime help can also operate in "hover" mode. This offers a very simple and convenient way to add the help for the panel, and it also makes delivery of the help an integral part of the application, so that it does not require anything apart from the Java code to display the help.

15 Claims, 6 Drawing Sheets

Increasing the Accessibility and Flexibility
of a Help Facility of a Computer Application 1. Support to present help text.

2. Support to enable the help facility.

3. Support to create help text.

4. Support to store help text.

Figure 2

FLEXIBLE HELP SUPPORT IN AN OBJECT ORIENTED APPLICATION

CROSS REFERENCE TO COPENDING APPLICATIONS

The disclosure of this application is related to the disclosures of the following copending applications:
"Business Logic Support," Ser. No. 09/616,800, filed Jul. 14, 2000;
"Text File Interface Support In An Object Oriented Application," Ser. No. 09/616,809, filed Jul. 14, 2000;
"Dynamic Java Beans For VisualAge For Java," Ser. No. 09/615,973, filed, Jul. 14, 2000; and
"Complex Data Navigation, Manipulation And Presentation Support," Ser. No. 09/615,976, filed Jul. 14, 2000;
the disclosures of the four above-identified copending applications are hereby incorporated herein by reference in their entireties.

BACKGROUND OF THE INVENTION

This invention generally relates to the help features of computer applications; and more specifically, the invention relates to procedures and mechanisms to simplify the use and management of such help facilities.

Many products support visual creation of panels; unfortunately, when it comes time to add the help text, the visual support vanishes and something very clumsy has to be done.

Traditional help mechanisms are platform dependent, and often require special tools which are not shipped with the visual product or the supporting platform.

There has been a move to use HTML and the Web Browser to provide a help that is more platform independent. However, this means the help is still stored away from the application (in HTML files). Also assignment of help is still a cumbersome process.

SUMMARY OF THE INVENTION

An object of this invention is to provide flexible help support in an object oriented application.

Another object of the present invention is to allow help text to be created visually and dynamically as the application is executing.

A further object of the invention is to provide a help facility that works in a number of platforms and which provides a context sensitive help mechanism.

These and other objectives are attained by providing a "helpHelper" bean which is attached (using the VisualAge visual editor) to the panel for which help is to be provided. The custom editor for the helpHelper bean brings up the target panel, along with a help editor panel that shows which component of the target panel is selected, allowing help for that part to be assigned. At run time, the helpHelper bean listens to which part of the panel is selected, and brings up the help for that part when it is requested (if F9 is hit). The runtime help can also operate in "hover" mode.

This offers a very simple and convenient way to add the help for the panel, and it also makes delivery of the help an integral part of the application, so that it does not require anything apart from the Java code to display the help.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 illustrates the major features of a preferred embodiment of the invention.

DETAILED DESCRIPTION OF THE PREFERRED EMBODIMENTS

Figure 1:
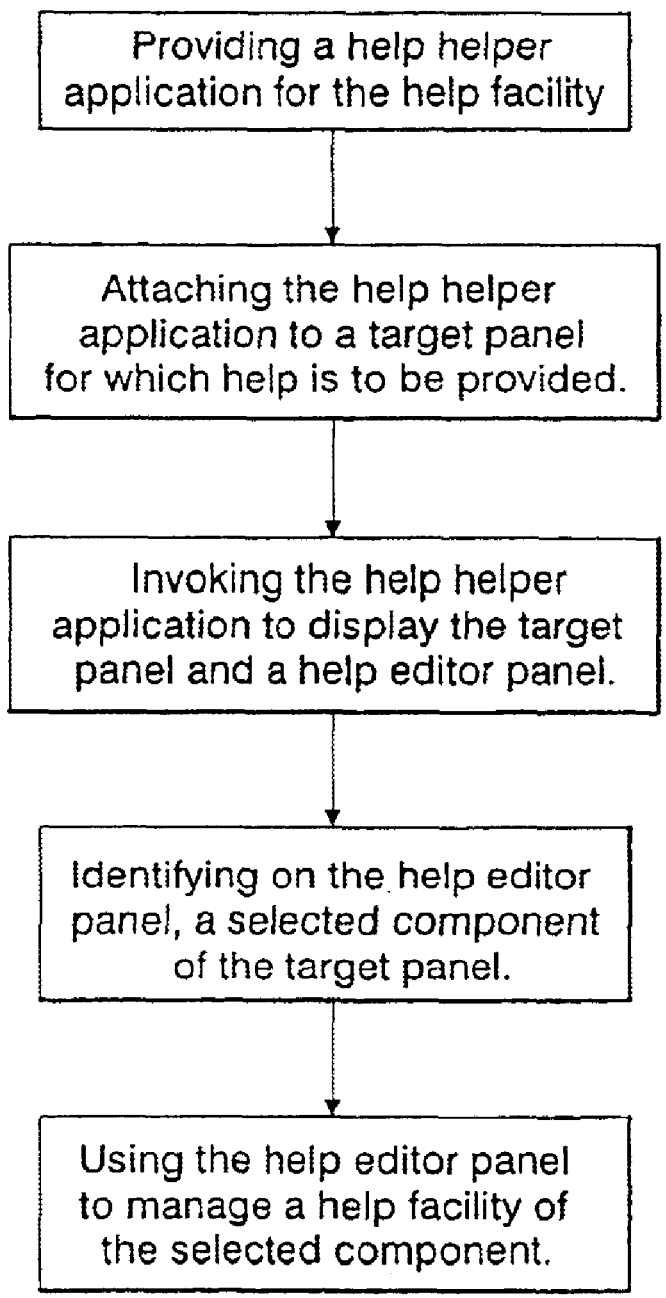
FIG. 1 is a flow chart outlining a method embodying this invention.

With reference to FIG. 1, a first aspect of this invention relates to a method for increasing the accessibility and flexibility of a help facility of a computer application. This method comprises the steps of providing a help helper application for the help facility; attaching the help helper application to a target panel for which help is to be provided; and invoking the help helper application to display the target panel and a help editor panel. A selected component of the target panel is identified on the help editor panel, and that help editor panel is used to manage a help facility of the selected component.

With reference to FIG. 2, the help helper application, for example, may be used to present help text, to enable the help facility of the selected component of the target panel, to create help text, and to store help text. Each of these features of the invention are discussed in detail below.

1. Support to Present Help Text.

Figure 3:
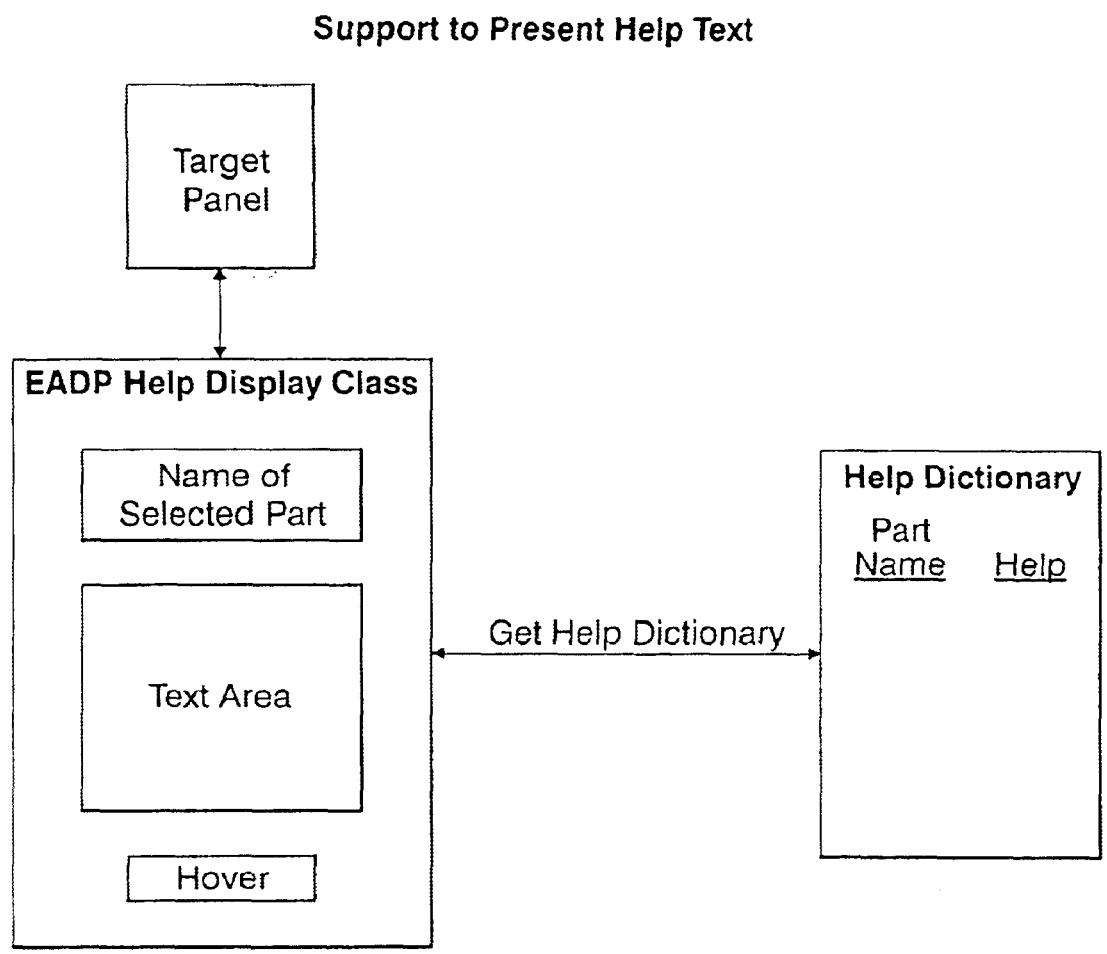
FIG. 3 graphically illustrates a feature of the present invention.

With reference to FIG. 3, help is displayed using the EADPHelpDisplay class. This frame part displays the external name of the panel part that was selected when help was invoked by pressing function key 9 (PF9) (if the help is in hover mode, this will refresh as the mouse moves over the target panel). A text area displays the appropriate help. Selection of the part to show help for is accomplished by left or right clicking the mouse button (the option to right click to select is useful for buttons, to avoid accidentally activating them).

The help text is found in the helpDictionary attribute. The EADHelpPanel interface part defines the getHelpDictionary method. Any panel that provides EADP help support may implement this interface by adding a bean feature called helpDictionary of type EADHelpDictionary (this class inherits from Hashtable and contains the help for that panel).

When help is searched for in the directory, the name of the selected part is used first as a key; if there is no help for that part, the search progresses up the component hierarchy for the panel. A standard help for the top level part should be supplied to use a default. If none at all is found, the help defaults to "No help available".

A button on the help display panel allows it to operate on hover mode. If this option is selected, the help panel remains visible, and the help that is displayed adjusts to the mouse position on the target panel. Right clicking the mouse button on a part on the target panel freezes the help at that part until the hover button is pressed again.

2. Support to Enable the Help Facility.

Figure 4:
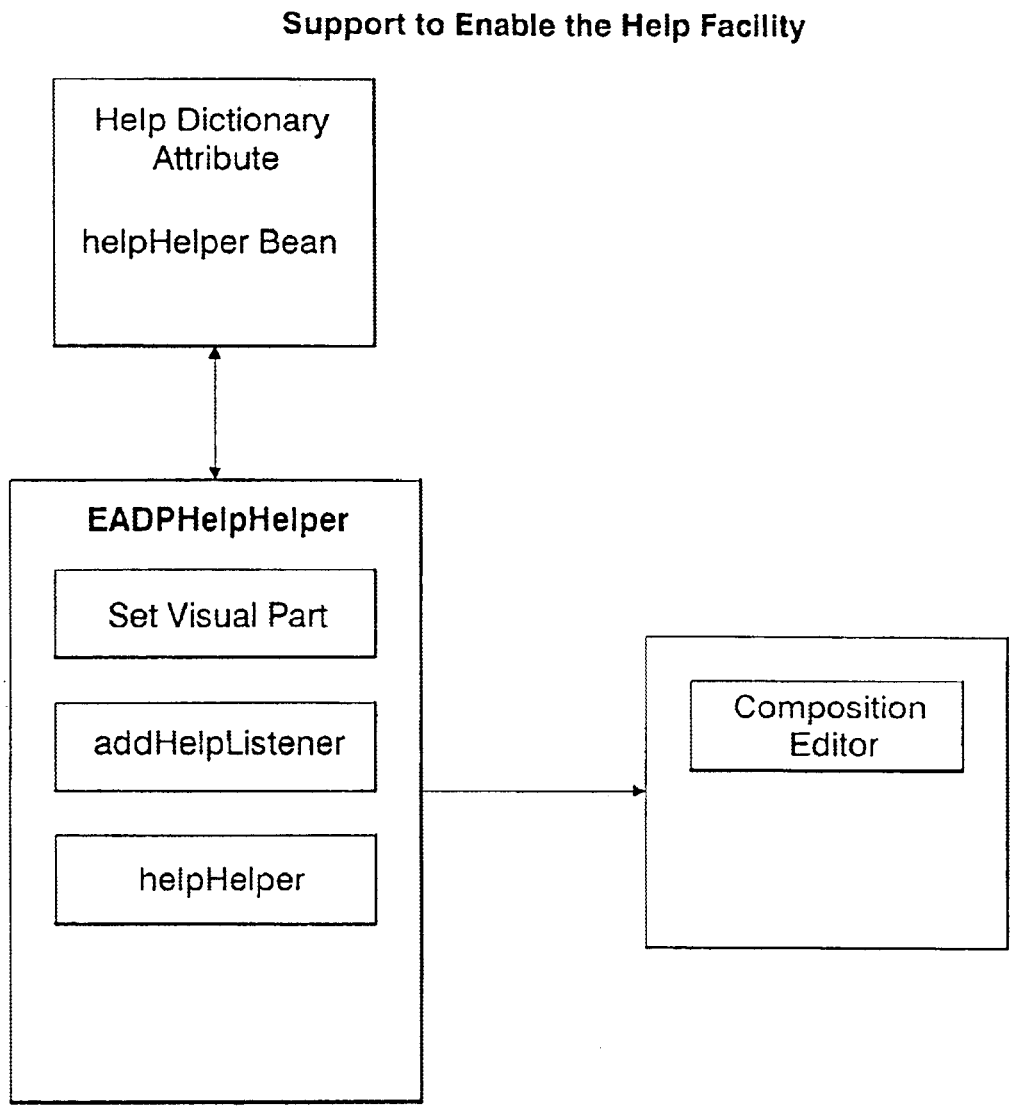
FIG. 4 graphically illustrates a second feature of this invention.

Because Java uses strong class typing, a standard interface (EADPHelpPanel) is preferably used for panels that use EADP preferred help support, as graphically illustrated in FIG. 4. Any panel using the support may implement this interface by adding the helpDictionary attribute (as described above) and by adding a HelpHelper bean of type EADHelpHelper. It is also preferred that the getHelpHelper method be public.

The EADHelpHelper part is used to add EADP help support to any existing VisualAge&®.window. It is added as a part in the Composition Editor, and its visualPart attribute is connected to the "this" attribute of the panel part. In VisualAge for Java, any connections are initialized after all other panel parts are created, so this one connection is enough to ensure initialization of the part.

When the connection is initialized, the setVisualPart method of the EADHelpHelper part is invoked. This method merges its own helpDictionary attribute with the one for the panel part (this is in case help was defined at both the helpHelper and the panel level). This method invokes the addHelpListener method passing the panel part.

The addHelpListener method adds the Helphelper part as a mouse listener and key listener for the passed part. It then iterates over all subparts for that part and recursively calls itself for each subpart. This is how all parts of the panel get added for help invocation.

The mouse listener is used to determine which part of the target panel (the attribute assigned to visualPart) is to be used for help selection. The lastPart attribute holds the name of the last part selected. If the doingHover attribute is true, this is refreshed each time the mouseEntered method is invoked. If the mousePressed method is invoked, the part selected when the mouse was pressed is assigned to lastPart, and doingHover is set to false. Both these methods invoke the belongsTo method (passing the current part from the passed mouse event and the visualPart attribute). This method works up the parentPart attribute tree for the current part to see if the visualPart is a parent.

Figure 5:
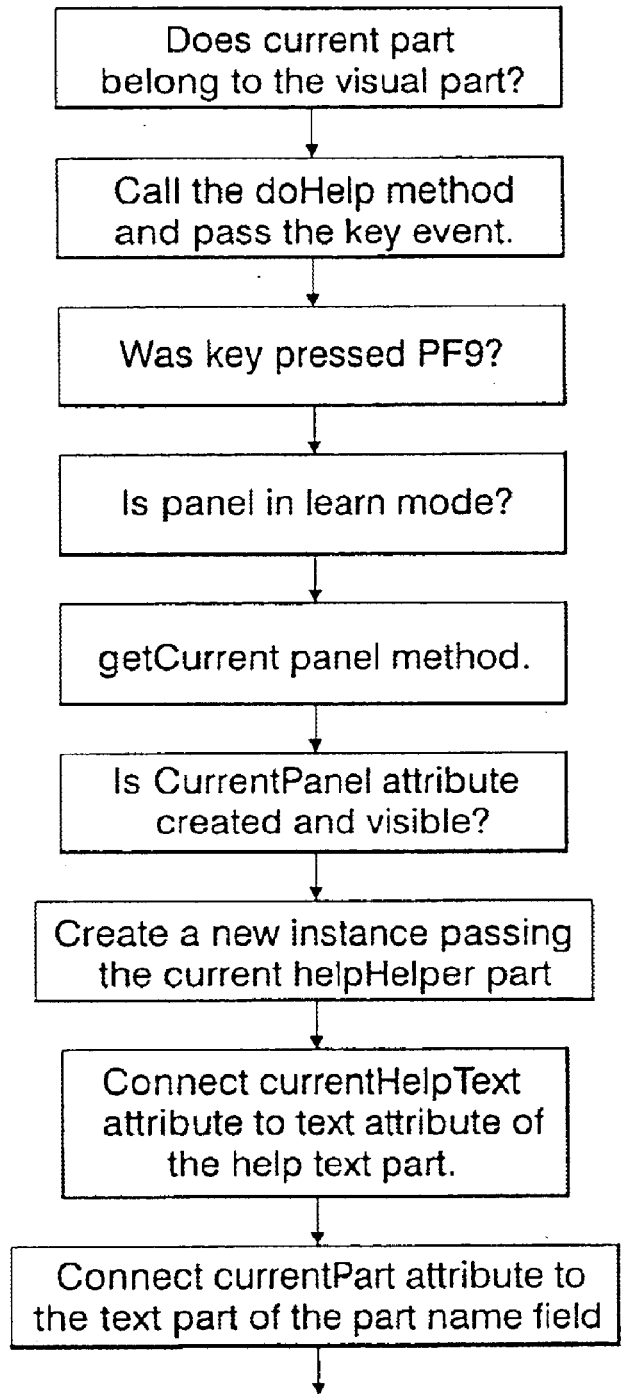
FIGS. 5 and 6 are flow charts showing methods that may be used in this second feature of this invention.

With reference to FIG. 5, The keyPressed method (use for the key listener) checks if the current part belongs to the visual part (using the belongsTo method) and if so it calls the doHelp method, passing the key event. The doHelp method checks if the key pressed was PF9. If it is, it checks if the panel is in learnMode (if it is, an edit panel is already visible). If not in learn mode, the getCurrentPanel method is invoked. In this method, a check is made to see if the currentPanel attribute (defined as an EADPHelpDisplay class) is created and visible. If not, a new instance is created, using a constructor that passes the current helpHelper part (the current EADPHelpHelper instance is assigned to the helpHelper attribute of the help panel). The currentHelpText attribute of the helpHelper part in the EADPHelpDisplay panel is connected to the text attribute of the help text part, and the currentPart attribute is connected to the text part of the part name field. When the setLastPart method is invoked on the helpHelper part, these attributes are refreshed.

Figure 6:
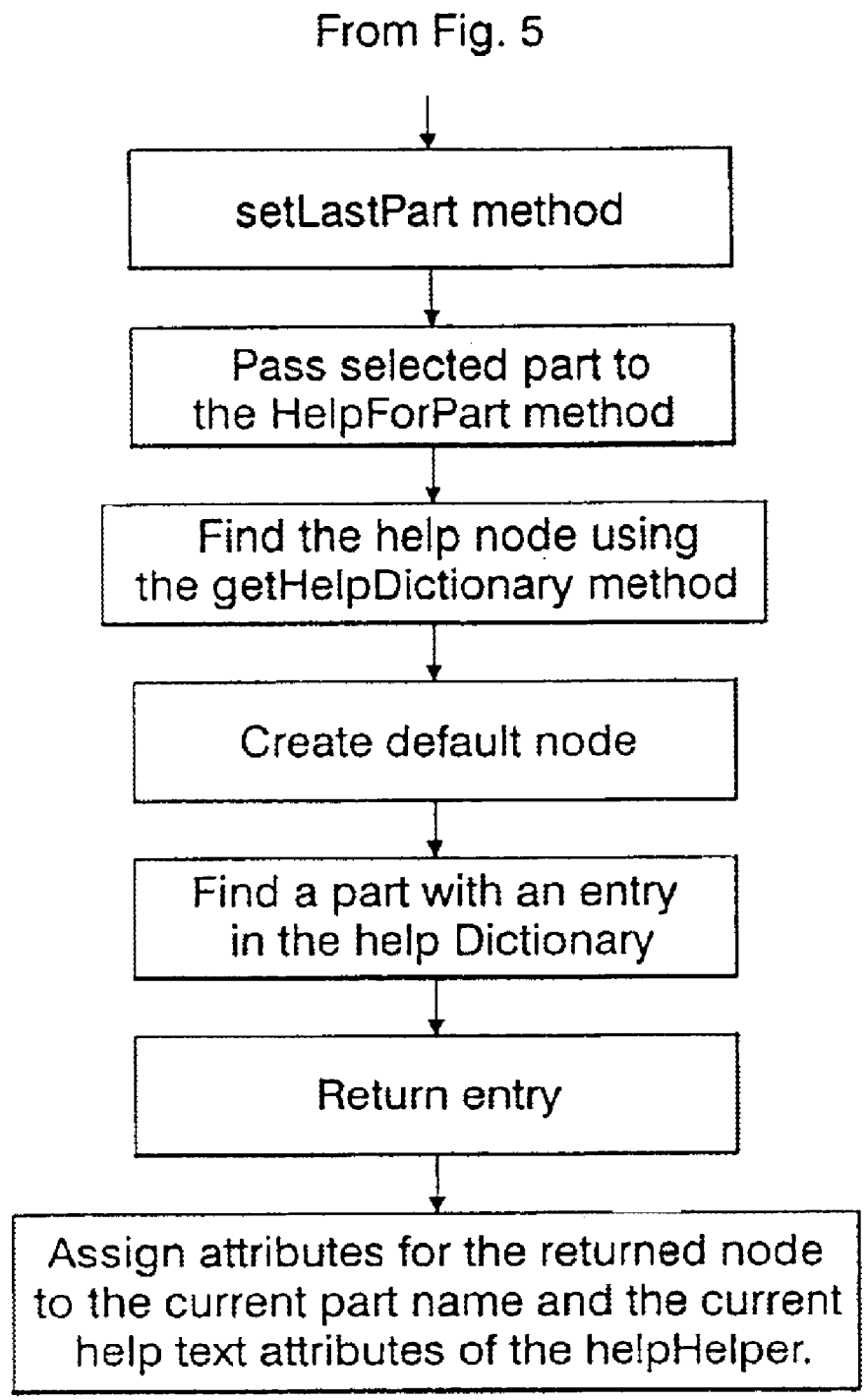

As generally illustrated in FIG. 6, the setLastPart passes the selected part to the helpForPart method. This uses the part name to find the help node for that part, using the getHelpDictionary method on the visualPart attribute. The help dictionary is keyed by the part name, and contains entries of type EADPHelpNode (this class has two string attributes, the externalPartName and the partHelp). The helpForPart method creates a default node using the actual part name for the externalPartName and the text "No help available" for the help text. It then works its way through the part and its parents (in the composition hierarchy) to find a part with an entry in the help dictionary. The entry for the first part found is returned.

The attributes for the returned node are assigned to the current part name and the current help text attributes of the help helper. This also refreshes the attributes on the help display panel (this is how hover mode is to accomplished).

3. Support to create help text.

For the Java implementation, help text is defined using a custom property editor (the EADPHelpDictionaryEditor). The help dictionary is defined as a bean property (of type EADPHelpDictionary) with EADPHelpDictionaryEditor as its editor. If the part that originated help is being customized, the helpDictionary feature in the helpHelper bean is used. If that part that originated help is used as a bean, its own helpDictionary feature is customized.

The getCustomerEditor method for the EADPHelpDictionaryEditor class brings up the EADPHelpEditDisplay class. This is similar to the EADPHelpDisplay, but it also includes a choice list for the part (the currently selected part and its parents in the widget hierarchy are shown). The panel has a show panel button which brings up the target panel (the one being customized) in test mode. The panel is cross linked with the editor part (the editor part has the panel as its editPanel attribute, and the panel has the editor part as its currentEditor attribute).

Clicking the button invokes the linkPanels method on the EADPHelpEditDisplay class. When the setVisualPart method on EADPHelpHelper is invoked, it sets a class attribute in the EADPHelpDictionaryEditor class (the currentPanel) to the class type of the passed visual part. This is used by linkPanels to determine which type of panel it needs to display. VisualAge tends to trash this information from one invocation to the next, so the class name of the panel (when it is known) is saved in the value attribute of the editor part (which in this case is an instance of EADPHelpDictionary) by adding an entry with key "linkedPanel".

If the class attribute is null, a check is made in the dictionary to see if there is an entry there. If all else fails, a dialog is presented to the user to enter the class name of the target panel. A test frame is created, and the target panel is added as a component. The target panel is linked to the editor by assigning the target panel's helpHelper attribute to the editor's helpHelper attribute, and by assigning the currentEditor attribute of the edit panel to the currentEditor attribute of the helpHelper for the target panel.

The setLastHelp method in EADPHelpHelper is defined to refresh the editor part if one is defined. This in turn refreshes what is displayed on the edit panel (so selecting a part on the target panel will display the choice list starting with that part, and the currently defined external name and help text for that part based on entries in the help dictionary held in the values attribute of the editor).

New information can be typed into the external name and text entry fields on the edit panel; pressing the save button updates the associated helpNode in the value help dictionary. Help can also be defined for parts higher up in the widget hierarchy by selecting them from the choice list.

4. Support to Store Help Text.

Help text is stored as a Java bean property, so the getJavaInitializationString method in EADPHelpDictionaryEditor is used to create an initialization string for the help text. This creates the string "new EADPHelpDictionary (getHelpDictionary( ),string)" where the string contains the initialization for the help dictionary. The call to getHelpDictionary is used to pull in any helps defined by a parent part (since the parent part will have been initialized before this code is invoked during the load of the panel).

The constructor that is invoked on EADPHelpDictionary first assigns any entries in the passed dictionary to itself, and then passes the string to the setupFromString method. This method expects the string to be broken up into triples of part name, and the help text, with ending separators of %P%, %N% and %T%. The getjavaInitializationString method iterates through the instance of EADPHelpDictionary held in the value attribute, and sets up the string in this format (skipping the entry for "linkedPanel").

The present invention has been implemented in the Enterprise Application Development Platform (EADP). The user manual for this facility is included herein a Appendix A.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of increasing the accessibility and flexibility of a help facility for a computer application, the method comprising the steps:

providing a help helper application for the help facility, the help helper application being a part of said computer application;

attaching the help helper application to a target panel for which help is to be provided;

invoking the help helper application to display both the target panel and a help editor panel at the same time;

listing on the help editor panel a set of components of the target panel;

identifying on the help editor panel one of the selected components of the target panel; and using the help editor panel to build a help feature, in the help facility, for the selected component.

2. A method according to claim 1, wherein the using step includes the step of using the help editor to present help text.

3. A method according to claim 1, wherein the using step includes the step of using the help editor to enable the help facility of the selected component.

4. A method according to claim 1, wherein the using step includes the step of using the help editor to store help text.

5. Apparatus for increasing the accessibility and flexibility of a help facility for a computer application, comprising:

a help helper application for the help facility, the help helper application being a part of said computer application;

a connector attaching the help helper application to a target panel for which help is to be provided;

means for invoking the help helper application to display both the target panel and a help editor panel at the same time;

means for listing on the help editor panel a set of components of the target panel;

means for identifying on the help editor panel one of the selected components of the target panel; and means for using the help editor panel to build a help feature, in the help facility, for the selected component.

6. Apparatus according to claim 5, wherein the using means includes means for using the help editor to present help text.

7. Apparatus according to claim 5, wherein the using the using means includes means for using the help editor to enable the help facility of the selected component.

8. Apparatus according to claim 5, wherein the using means includes means for using the help editor to store help text.

9. A program storage device readable by machine, tangibly embodying a program of instructions executable by the machine to perform method steps for increasing the accessibility and flexibility of a help facility for a computer application, said method steps comprising:

providing a help helper application for the help facility, the help helper application being a part of said computer application attaching the help helper application to a target panel for which help is to be provided;

within the execution of the computer application for which help is being provided, displaying the target panel for that application and invoking the help helper for a component of that target panel by requesting help from that component;

listing on the help editor panel a set of components of the target panel;

identifying on the help editor panel one of the selected components of the target panel; and using the help editor panel to build a help feature in the help facility, for of the selected component.

10. A program storage device according to claim 9, wherein the using step includes the step of using the help editor to present help text.

11. A program storage device according to claim 9, wherein the using step includes the step of using the help editor to enable the help facility of the selected component.

12. A program storage device according to claim 9, wherein the using step includes the step of using the help editor to store help text.

13. A method according to claim 1, wherein:

the help helper application includes a dictionary storing a set of help texts; and the step of using the help editor panel includes the step of using the selected component of the target panel as a key to identify one of the help texts stored in said dictionary.

14. Apparatus according to claim 5, wherein:

the help helper application includes a dictionary storing a set of help texts; and the means for using the help editor panel includes means for using the selected component of the target panel as a key to identify one of the help texts stored in said dictionary.

15. A program storage device according to claim 9, wherein:

the help helper application includes a dictionary storing a set of help texts, and the step of using the help editor panel includes the step of using the selected component of the target panel as a key to identify one of the help texts stored in said dictionary.

* * * * *